United States Patent [19]
Lindsay

[11] Patent Number: 5,201,546
[45] Date of Patent: Apr. 13, 1993

[54] TOWABLE FLOOR FRAME ASSEMBLY

[75] Inventor: Fredrick H. Lindsay, Seminole, Fla.

[73] Assignee: Lindsay Industries, Inc., Seminole, Fla.

[21] Appl. No.: 774,939

[22] Filed: Oct. 11, 1991

[51] Int. Cl.$^5$ .............................................. B62D 63/06
[52] U.S. Cl. .................... 280/789; 52/143; 52/648.1; 52/693
[58] Field of Search ................. 280/789, 785; 52/143, 52/648, 693

[56] References Cited

U.S. PATENT DOCUMENTS

| | | | |
|---|---|---|---|
| 3,716,267 | 2/1973 | Lindsay | 52/143 |
| 4,015,375 | 4/1977 | Lindsay | 52/143 |
| 4,019,299 | 4/1977 | Lindsay | 52/648 |
| 4,084,834 | 4/1978 | Becker | 280/789 |
| 4,106,258 | 8/1978 | Lindsay | 52/693 |
| 4,131,301 | 12/1978 | Werner | 280/789 |
| 4,232,884 | 11/1980 | DeWitt | 280/785 |
| 4,863,189 | 9/1989 | Lindsay | 280/789 |
| 4,930,809 | 6/1990 | Lindsay | 280/789 |
| 4,971,355 | 11/1990 | Studdard | 280/789 |

*Primary Examiner*—Kenneth R. Rice
*Attorney, Agent, or Firm*—Lowe, Price, LeBlanc & Becker

[57] ABSTRACT

A towable unified floor frame assembly derives lengthwise strength from two elongate I-beams disposed symmetrically about a longitudinal axis. The I-beams are separated by a plurality of angle-sectioned metal cross members welded therebetween. A plurality of trusses, corresponding in number and location to the metal cross members, is disposed to support an outer perimeter and a floor thereabove. Each truss incorporates upwardly inclined bracing elements located outwardly of the I-beams connected to flat metal connecting elements individually unified to the I-beams, preferably by welding. A waterproof and dirt-excluding cover entirely covers the underneath of the floor frame assembly. Heating and ventilating ducts, power and telephone wires, water and waste pipes, thermal insulation and the like, are installed within the floor frame assembly. The entire floor frame assembly, and any superstructure built thereon, may be readily towed to a selected location on a plurality of wheels detachably mounted to brackets provided underneath the I-beams, a towing force being applied by a forwardly disposed detachable towing hitch. The floor frame assembly and its superstructure to rest on the wheels and a jack supporting the towing hitch or, optionally, may be supported underneath the I-beams by externally provided support elements.

16 Claims, 5 Drawing Sheets

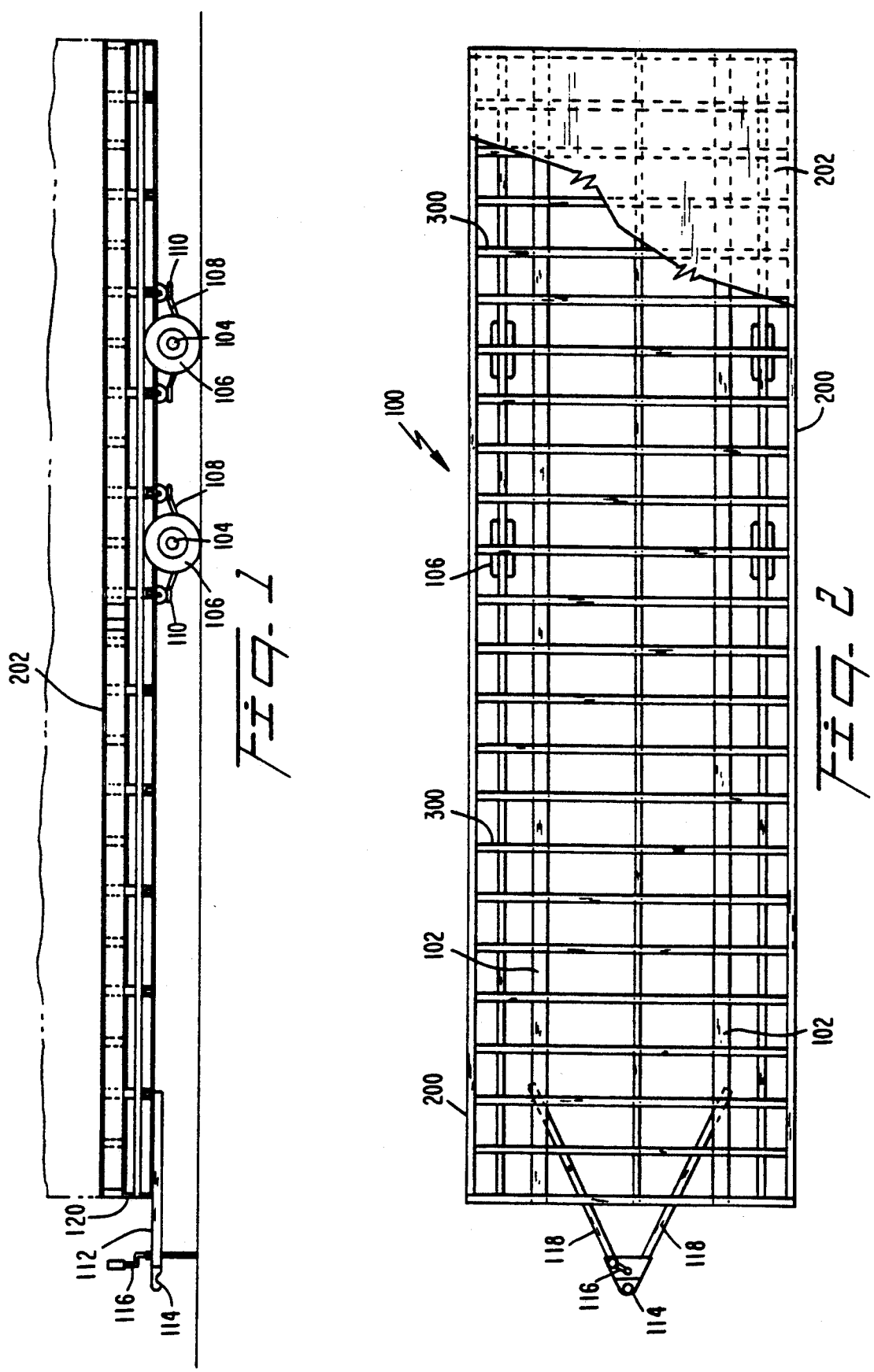

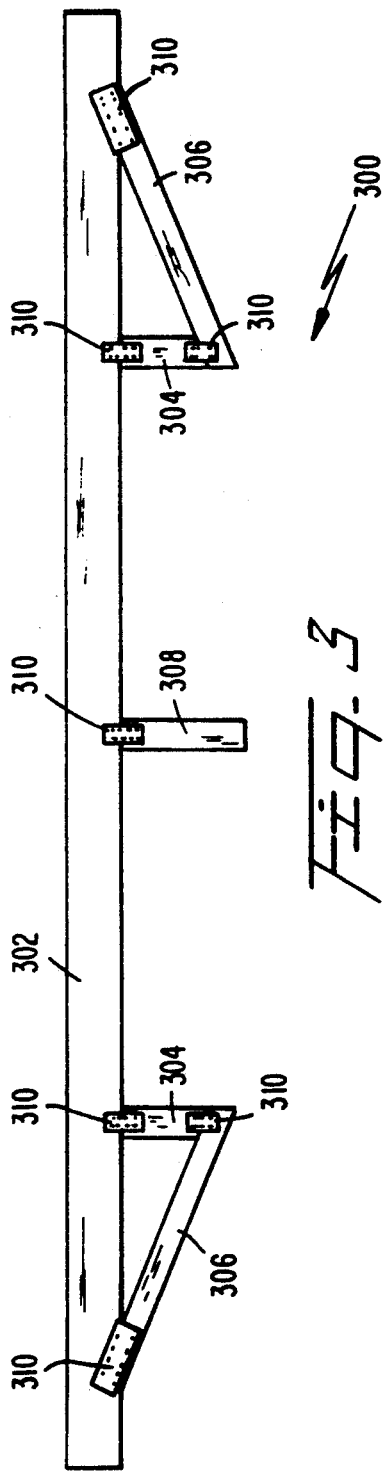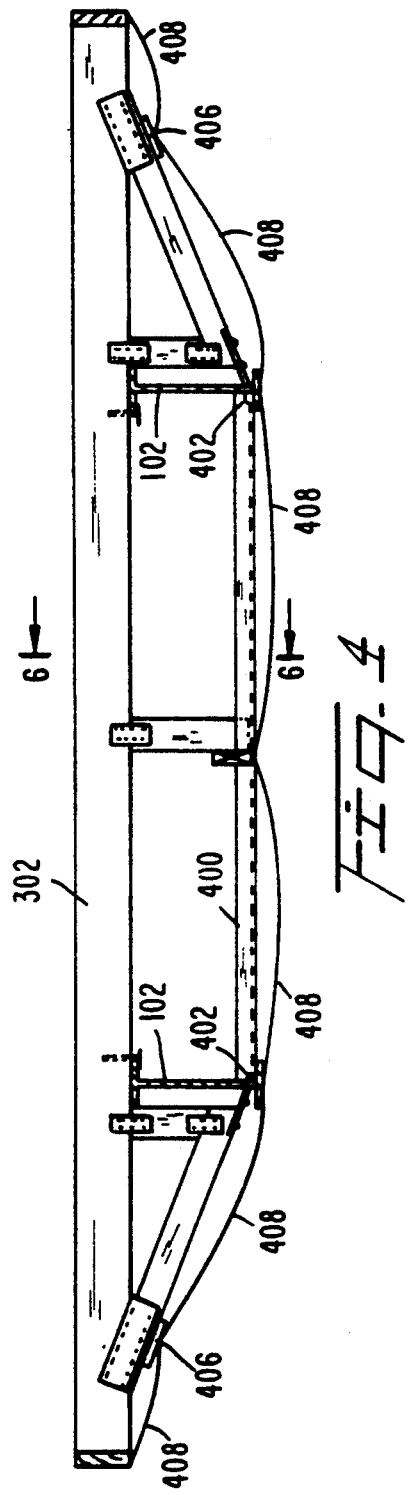

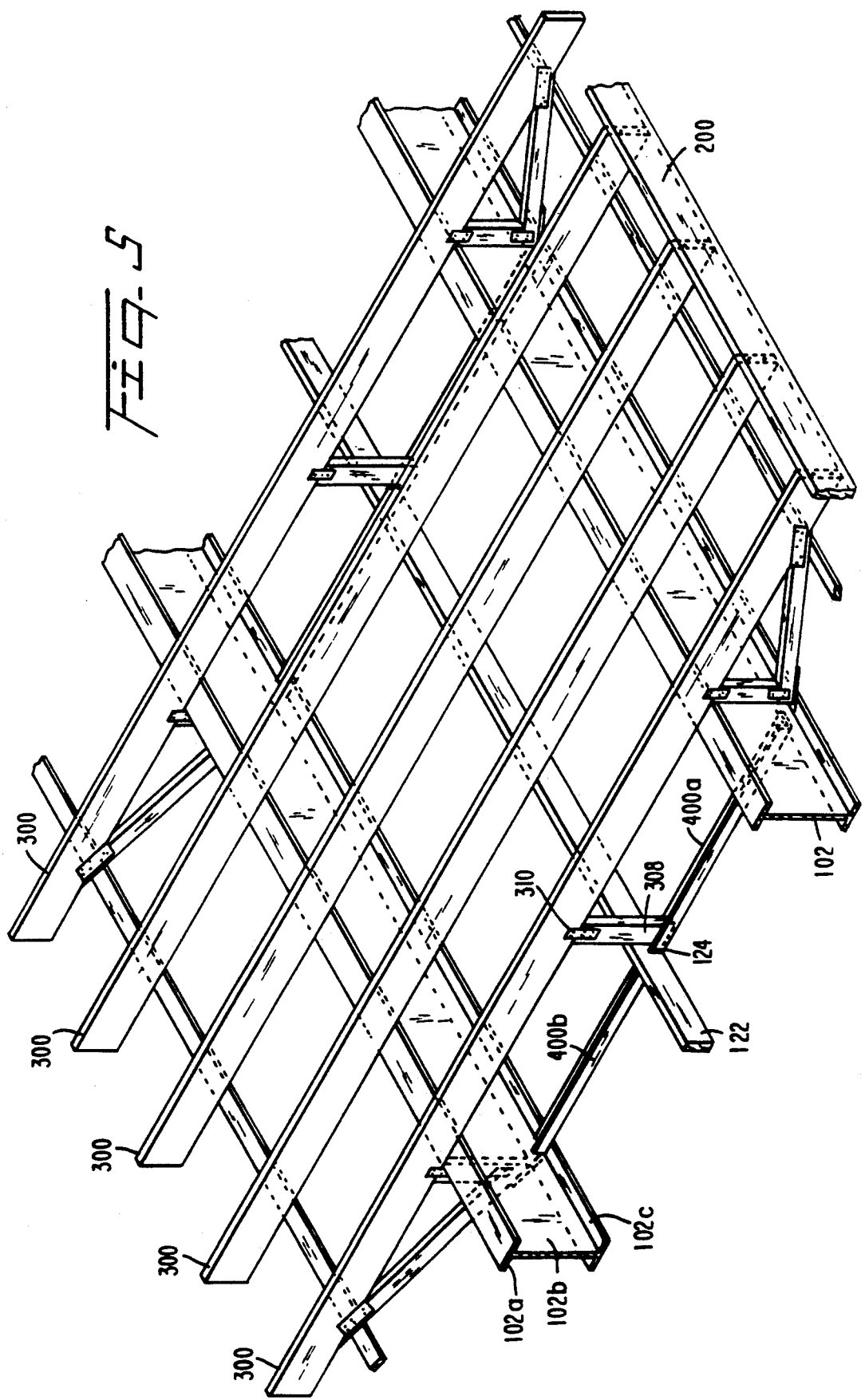

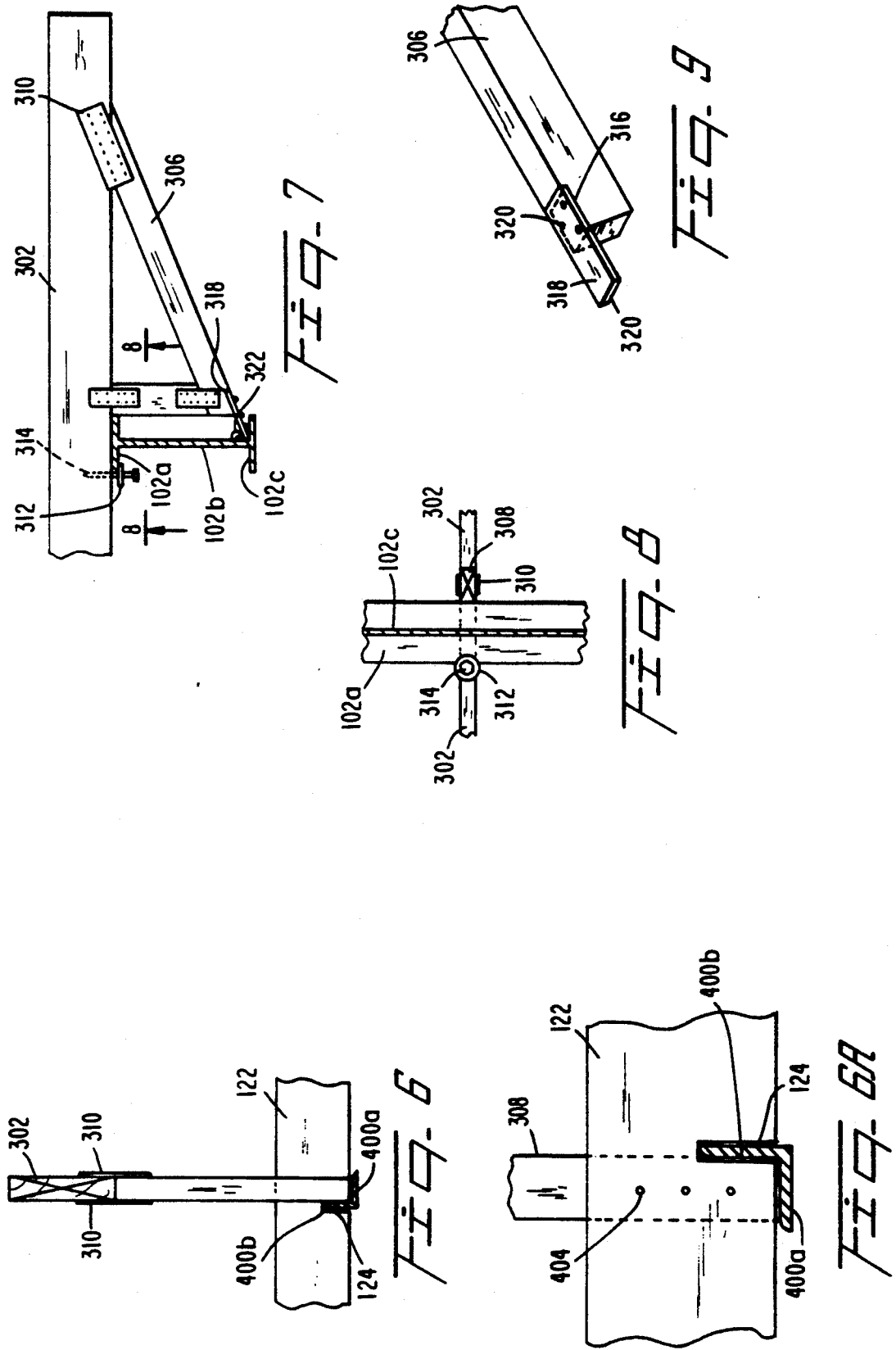

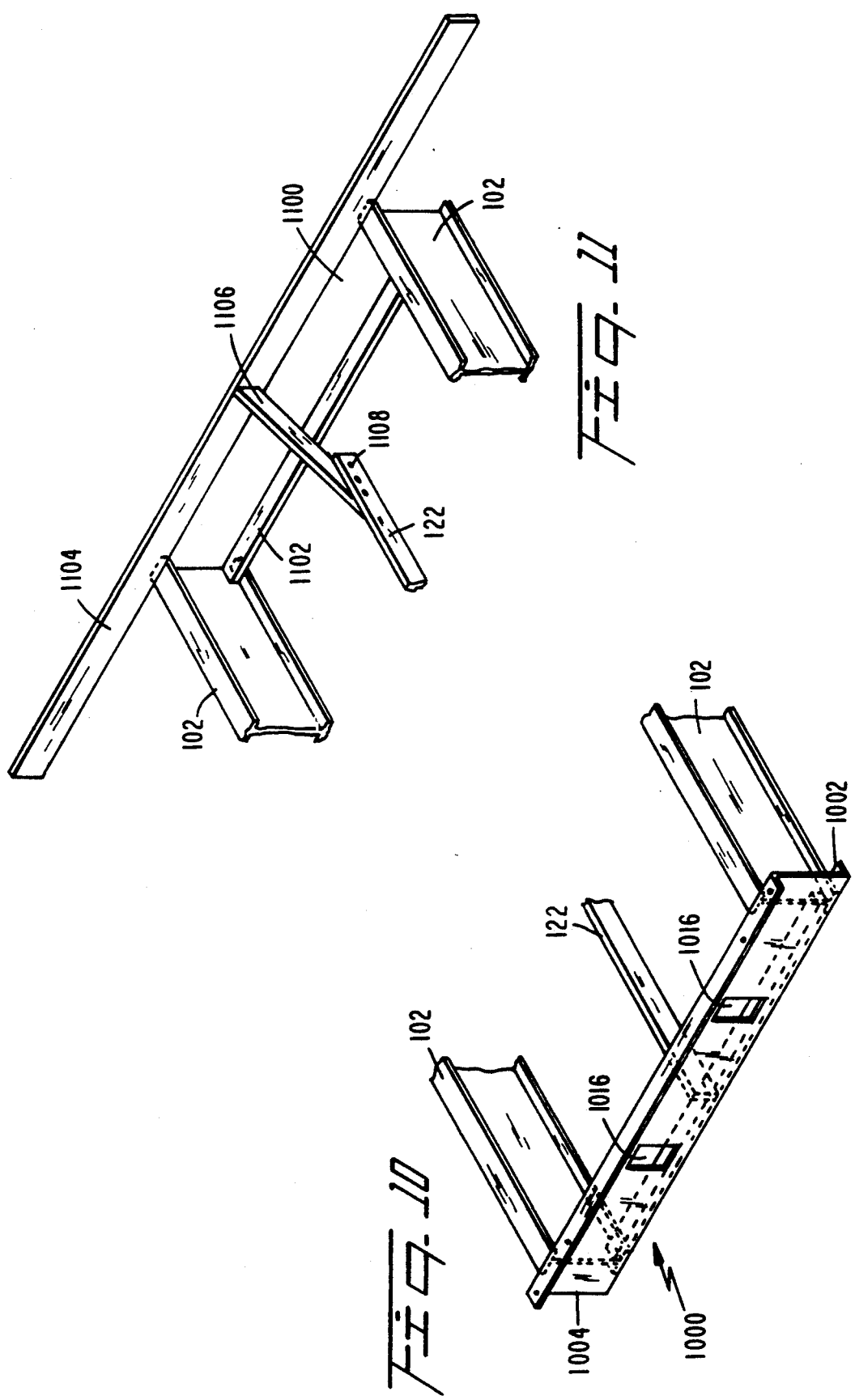

5,201,546

TOWABLE FLOOR FRAME ASSEMBLY

FIELD OF THE INVENTION

This invention relates to a towable floor frame assembly and, more particularly, to a towable floor frame assembly within which load-bearing elongate metal I-beams are securely unified with a plurality of crosswise trusses substantially comprising wood.

BACKGROUND OF THE PRIOR ART

As conventional building methods become increasingly expensive, it has become more desirable for prospective homeowners to consider using prefabricated elements, e.g., completed floor frame assemblies, for building new homes. Such floor frame assemblies are most conveniently manufactured at one location and then, with or without the addition thereto of a roof, walls, windows, doors and other superstructure, are towed along public highways to their ultimate destinations.

If the ultimate structure is to be located in one place for a long time, it would be desirable to be able to detach the wheels and towing hitch for reuse elsewhere. Sometimes, however, it is intended that the dwelling should be only temporary, e.g., to serve as an office for a construction superintendent at a building site, in which case it may be more practical to leave the structure mounted on a wheel assembly so as to be partially supported by the towing hitch. It can then be readily towed as desired.

Considerable work has been done in the field of this invention in meeting the above-outlined needs. Some of the known solutions are exemplified in my own patents, U.S. Pat. Nos. 3,716,267, 4,015,375, 4,019,299, 4,106,258, 4,863,189 and 4,930,809, all of which are incorporated herein by reference. Each of these patents teaches a solution which may be optimum under particular circumstances.

For example, the above-incorporated U.S. Pat. No. 4,930,809, teaches a unified floor frame assembly that has outer load-bearing elongate beam sections which are butt-spliced to be cambered in parallel vertical planes to counter forces which tend to cause sagging of a very long floor frame assembly during transportation thereof. Similarly, another above-incorporated patent, U.S. Pat. No. 4,863,189, discloses a towable floor frame assembly formed principally of wood material, with inner load-bearing beams being optionally formed of multi-veneered wood connected by a cambered connection made of metal and/or being further strengthened by elongate outer metal channel-section elements attached to the wood. Each of my other above-incorporated patents teaches floor frame assembly structures in which a pair of internally disposed steel I-beams provide a substantial portion of the lengthwise load-bearing capacity.

There remains, however, a need for improvements in floor frame assemblies, and the present invention addresses a need for a relatively light but very strong unified floor frame assembly to which may be attached readily detachable wheels and a towing hitch for maximum versatility in use as described hereinabove.

SUMMARY OF THE DISCLOSURE

Accordingly, it is a principal object of this invention to provide a very strong but light-weight modular towable floor frame assembly deriving its lengthwise strength and load-bearing capacity principally from two inner elongate metal I-beams.

It is another object of this invention to provide a towable floor frame assembly employing two parallel metal I-beams for lengthwise strength, wherein transverse wooden trusses are very securely and rigidly attached to the I-beams.

It is a further related object of this invention to provide a strong, rigid, light-weight, towable floor frame assembly utilizing a pair of parallel metal I-beams for strength and a plurality of transverse essentially wooden trusses securely attached to the I-beams, wherein ample room is provided beneath a floor of the structure to accommodate within an external dirt-excluding cover such utility elements as thermal insulation, ventilation and heating ducting, piping for water and waste, and electrical and telephone wires.

These and other related objects of this invention are realized by providing a towable floor frame assembly which comprises:

two elongate inner load-supporting steel I-beams disposed parallel to a longitudinal axis of said floor frame assembly, each of said I-beams having respective front and rear ends;

a front member and a rear member, connected normal to and between the respective front and rear ends of said I-beams;

a plurality of elongate metal cross members, each having an L-shaped cross-section with a vertical portion thereof disposed above a horizontal portion, said cross members extending normal to and between the I-beams to be connected to at least lower flanges thereof;

an elongate inner member disposed longitudinally along said axis, said inner member being provided with a plurality of vertical notches which are shaped, sized and located to fit over and closely receive said vertical portions of said L-shaped cross members;

two elongate outer members attached to said front and rear end members to define therewith a perimeter of said floor frame assembly, said perimeter having substantially vertical inner and outer perimeter surfaces substantially defined by corresponding inner and outer surfaces of said outer members and said front and rear end members;

a plurality of trusses disposed normal to said I-beams and said outer members, said trusses being disposed at predetermined locations inwardly of said front and rear ends of said outer beams in correspondence with respective ones of said cross members, each truss being connected at respective outermost ends to said elongate outer members at said inner perimeter surface provided thereby, wherein each of said trusses comprises an upper horizontal element disposed above said I-beams and having an uppermost surface coplanar with respective uppermost surfaces of said front and rear end members and said elongate outer members, a vertically depending central element located to fit to a side of said inner member and to end inside a corresponding L-shaped cross member, two vertically depending outer elements, respectively located to fit closely to the outermost edge of an upper flange of a corresponding one of said I-beams, and two bracing members, each extending outwardly and upwardly from the lowermost end of a corresponding one of said outer elements to connect underneath the upper horizontal element at a location intermediate the closest I-beam and the closest distal end of said upper horizontal element;

a plurality of metal connecting elements, each attached underneath one of said inclined bracing elements beneath the respective lowermost end thereof and attached at a distal end to the closest I-beam, whereby each of said trusses is securely connected to both I-beams;

a floor mounted atop and to said elongate outer beams, said front and rear end members, and said trusses;

carrier means comprising a plurality of load-bearing wheels, said carrier means being shaped and sized to detachably attach underneath said I-beams; and hitch means securely attachable to said I-beams at the respective front ends thereof for applying a towing force to said floor frame assembly.

BRIEF DESCRIPTION OF DRAWINGS

FIG. 1 is a side elevation view of the floor frame assembly according to a preferred embodiment of this invention, mounted on a plurality of wheels and incorporating a towing hitch, with trusses and I-beams of the structure exposed.

FIG. 2 is a plan view of the floor frame assembly structure per FIG. 1, with a portion of the flooring indicated therein.

FIG. 3 is a vertical elevation view of an exemplary truss in accordance with the preferred embodiment.

FIG. 4 is a vertical, partially cross-sectional view of the preferred embodiment of the floor frame assembly, with all essential elements included.

FIG. 5 is a perspective view of various structural elements of the floor frame assembly in the preferred embodiment of this invention.

FIG. 6 is an end elevation view of an exemplary truss shown in conjunction with the elongate inner member and a metal L-shaped cross-sectioned transverse member.

FIG. 6A is an enlarged elevation view of the lower portion of FIG. 6 from an opposite perspective.

FIG. 7 is an elevation view of a portion of an exemplary truss, to facilitate an understanding of the manner in which various attachment means are employed to attach the truss to an I-beam.

FIG. 8 is a partially sectioned plan view at section 8—8 in FIG. 7, to further clarify the use of certain attachment means for attaching a truss to an I-beam in the preferred embodiment.

FIG. 9 is a perspective end view of an inclined bracing member in an exemplary truss.

FIG. 10 is a partial perspective view of the front end of floor frame assembly according to the preferred embodiment.

FIG. 11 is a partial perspective view of a portion of the rear end of the floor frame assembly according to the preferred embodiment.

DESCRIPTION OF THE PREFERRED EMBODIMENTS

As best understood with reference to FIGS. 1 and 2, the overall shape of the floor frame assembly 100, in a preferred embodiment, is that of an elongate rectangle in plan view. The overall depth of the structure is largely determined by the total vertical dimension of the pair of elongate I-beams 102, 102 disposed parallel to each other in the longitudinal direction of an axis X—X of the floor frame assembly and the vertical dimension of the uppermost transverse element 302 of a typical truss 300 which is best seen in detail in FIGS. 3 and 4.

In its disposition for towing, floor frame assembly 100 is conveniently mounted on a plurality of axles 104 each rotatably supported on at least one pair of road wheels 106. The axles 104 may each be mounted in any known manner, e.g., by leaf springs 108, 108 to mounting brackets 110, 110 attached to the lowermost portions of I-beams 102, 102 toward a rear end of floor frame assembly 100. If desired, upon towing of floor frame assembly 100 to its ultimate destination, any known support means, e.g., blocks, a support wall, vertical stands, etc., may be provided to receive the weight of the floor frame assembly and any superstructure. The plurality of wheels, axles, etc., collectively referred to hereinafter as a "carrier means" for convenience, may then be detached and removed for reuse elsewhere.

At the forward end of the floor frame assembly 100, there is detachably attached a known type of towing means 112 such as a towing hitch having, for example, a conventional ball and socket type connector fitting 114 at its forwardmost end. A manually-operable crank jack 116 may also be provided as part of the towing means 112 to at least temporarily support the front end of floor frame assembly 100 when the same is not being actively towed or otherwise securely supported.

As will be appreciated, details of the wheel carrier means and the towing means can be selected to suit a user, keeping in mind the size of the overall floor frame assembly and the presence of any superstructure thereon. In the preferred embodiment, the towing means comprises two elongate members 118, 118, which are partially passed through a metal front end member 120, via openings 1016, 1016 provided therein (as best seen in FIG. 10). These elongate members 118, 118 are securely attached at their respective inner ends to I-beams 102, 102 by any known means, such as bolts and nuts. What is important to note is that the forwardmost end fitting 114 of towing means 112 is preferably located on the longitudinal axis X—X for safe and efficient towing of the entire assembly at highway speeds.

The internal elements of floor frame assembly 100 will now be discussed in detail with particular reference to FIGS. 3, 4 and 5.

The floor frame assembly 300 according to the preferred embodiment of this invention utilizes only a single kind of truss 300, best seen in FIG. 3.

The upper transverse elongate element 302 substantially determines the overall width of the completed floor, and can be selected to suit specific needs. For most practical uses of such floor frame assemblies, it is most practical to form transverse elongate element 302 of a length of wood of 2"×4" cross-section, with the longer side vertical. Attached directly underneath the transverse elongate element 302, and located symmetrically with respect to a midpoint thereof so as to depend downwardly therefrom during use (as best understood with reference to FIGS. 4 and 5), are two short outer vertical elements 304, 304. The downwardly depending inner sides of elements 304, 304 are spaced apart by a distance sufficient to closely accommodate immediately adjacent thereto respective ones of the two I-beams 102, 102. This is seen most clearly in FIGS. 4 and 5. As will be noted from FIG. 3, the lowermost ends of downwardly depending elements 304, 304 are cut at a preselected angle and attached thereunder are respective inclined bracing elements 306, 306 which extend from the lowermost ends of elements 304, 304 outwardly and upwardly to be connected to transverse elongate element 302 at respective points inwardly of its outermost ends. The angle of inclination of bracing elements 306, 306 with respect to elongate element 302 is preferably in the range 25°-50° and will, of course, determine the exact length of bracing elements 306, 306 and the locations of the points at which their respective uppermost ends are connected to transverse elongate element 302.

Also provided normal to and depending downwardly of transverse elongate element 302 is an inner element 308 located so that one of its vertical sides is slightly to one side of the midpoint of transverse element 302. Details of the exact location and the purpose for its selection will become clearer from a more detailed description hereinafter of how the truss is connected to other elements of the floor frame assembly.

Transverse elongate element 302, downwardly depending outward elements 304, 304, inclined bracing element 306 and inner downwardly depending element 308 are connected as indicated in FIG. 3, by nailplates 310, applied from both sides (as clearly seen in FIG. 6), to ensure secure, rigid and lightweight connection between the respective wooden elements.

Referring now to FIGS. 4 and 5, it will be seen that the pair of parallel elongate I-beams 102, 102 have their respective vertical flanges 102b, 102b separated at inside surfaces thereof by the lengths of a plurality of metal cross members 400 which preferably have L-shaped cross-sections. As clearly illustrated in FIGS. 3, 4, 5, 6 and 6A, cross members 400 are selected to be of a suitable length so as to space apart I-beams 102, 102 as desired, and each cross member is disposed so as to have one arm 400a of its L-shaped cross-section horizontal and the other arm 400b extending vertically thereabove.

Cross members 400 are preferably made of a weldable steel so as to be welded at their extreme ends to inside surfaces of I-beams 102, 102 by the use of any known welding process, e.g., electric arc welding, gas welding, or even by brazing. Depending on the convenience and the availability of suitable welding equipment or the lack thereof, even riveting may be employed for connecting the ends of metal cross members 400 to I-beams 102, 102. What is most important is that no matter how such connections are made, the I-beams are unified to each other through a plurality of such metal cross members 400. The exact distribution of the plurality of cross members 400 along the axis X—X is a matter of choice influenced by considerations of cost, overall weight, the service duty to be imposed on the finished floor frame assembly, and perhaps even by secondary factors such as the stresses likely to be encountered by the finished floor frame assembly during towing to one or more sites. Likewise, the thickness and exact dimensions of the L-shaped cross-section of the typical cross member 400 are matters of design choice directed by considerations similar to those listed above. FIG. 4 illustrates an exemplary cross member 400 welded by welds 402 to the two I-beams 102, 102.

In addition, along the longitudinal axis X—X of floor frame assembly 100 there is provided an elongate inner member 122, preferably made of wood, extending for the full length of floor frame assembly 100. A suitable cross-section for this longitudinally elongate inner member 122 would be the same as that for the upper transverse elongate element 302 of the typical truss 300, e.g., 2"×6". As clearly shown in FIGS. 5 and 6a, the elongate inner member 122 is provided with notches 124 shaped and sized to closely receive the vertical portions 400b of cross members 400.

As will be appreciated, the distribution of cross members 400 and of a corresponding number of trusses 300 thereabove along the length of floor frame assembly 300 is another matter of design choice directed by factors described earlier. As indicated in FIG. 5, there may be provided simple elongate transverse beams 500, comparable to the upper transverse elongate elements 302, between trusses 300 to save cost and weight. In any case, for each cross member 400 there is a corresponding notch 124 formed in elongate inner member 122. As best seen in FIGS. 5 and 6a, downwardly depending inner element 308 of each truss 300 fits into the corner formed by a vertical surface of inner elongate member 122 and an inner face of vertical portion 400b of the corresponding cross member 400. Nails, screws, or other known elements 404 may be used to physically connect downwardly depending element 308 to elongate inner member 122, as best seen in FIG. 6A.

As best seen in FIGS. 7 and 8, each truss 300 is also connected to the uppermost horizontal flange 102a, 102a of I-beams 102, 102 by the use of known means such as a lag washer 312 and nail 314.

As best seen in FIG. 9, at the lowermost end of each inclined bracing element 306 there is preferably formed a recess 316 of a size sufficient to accommodate approximately one half of a preferably rectangular flat metal plate connecting element 318 which is connected to bracing element 306 by a plurality of nails, screws or other known means 320. The actual length of flat metal connecting element 318, as best understood by reference to FIG. 7, is selected such that the distal end 320 thereof is immediately adjacent to a vertical surface of vertical web 102b of an I-beam 102, preferably very close to a corner formed by vertical web 102b and lower flange 102c of that I-beam 102. The distal end 320 of the metal connecting element 318 is then unified to the corresponding I-beam 102 by welding 322 in any known convenient manner. See FIG. 7. As persons skilled in the relevant mechanical arts will appreciate, brazing could, at least in principle, be used instead of welding for this purpose, although this would incur a higher expense.

The key principle, however, is that each of a selected number of similar, essentially wooden trusses 300 are individually, very strongly, attached to each of the two longitudinally disposed I-beams 102, 102 which are themselves unified to each other by a plurality of welded metal cross members 400, the midpoints of cross members 400 being longitudinally spaced by notches 124 receiving the vertical portions 400b of cross members 400 where downwardly depending inner elements 308 are connected to elongate inner member 122. Such a structure is found to provide a very strong, rigid, lightweight, modularly sizable frame for a towable floor frame assembly.

In addition to the above-described structural elements, it is convenient to also provide two elongate cover-supporting elements 406, 406, respectively connected to outside surfaces of corresponding inclined bracing elements 306, 306 on both sides along the full length of the structure.

As best seen in FIG. 10, a metal front end part 1000, having a cross-section comparable to a stylized S-shape, is connected to the fowardmost ends of I-beams 102, 102 in any known manner, e.g., by welding. Front end part 1000 is formed to have a rearwardly oriented horizontal base portion 1002, a vertical web portion 1004 and a flat horizontal forwardly oriented top portion 1006. As clearly shown in FIG. 10, the uppermost surfaces of top horizontal portion 1006 and I-beams 102, 102 are preferably coplanar. The overall length of front end part 1000 is preferably less than the full overall width of floor frame assembly 100.

As best seen in FIG. 11, at the rear ends of I-beams 102, 102 is a metal rear end part 1100 generally similar in form to front end part 1000 except that it lacks counterparts to holes 1016, 1016. Lying over an inside surface of lower horizontal portion thereof, there is conveniently provided a wooden cross member 1102. Similarly, over the upper horizontal surface of rear end part 1100 there is provided a transverse rectangular cross-section wooden member 1104 having the same cross-section and length as the typical upper transverse elongate element 302 of a truss 300. This wooden transverse member 1104 may be braced by the provision of a forward bracing element 1106 connected at a lower end to the rear end of elongate inner member 122 by any known means such as nails 1108. Similar elements (not shown) are also provided at the front end.

Note, as mentioned earlier, that the vertical web portion 1004 of front end 1000 is formed so as to have two holes 1016, 1016 through which elongate portions 118, 118 of towing means 112 project into the floor frame assembly to be connected in any known manner to the vertical web portions of I-beams 102, 102 in detachable manner.

As will be appreciated, by appropriate selection of the vertical dimensions of I-beams 102, 102 the general framework described hereinabove will provide space between the vertical web portions of I-beams 102, 102 ample room for installation of one or more of heating and ventilating ducts, fresh water and waste pipes, power and telephone wiring, insulation fitted to suit, and the like. Such utility-related elements are most conveniently installed before any additional elements, e.g., flooring, covering, etc., are permanently attached to the elements described thusfar. For the sake of simplicity, details of such utility-related elements are not expressly illustrated in the figures but, as previously noted, my earlier-issued U.S. patents are incorporated herein by reference for related descriptions and illustrations of how such utility-related elements may be installed within a floor frame assembly generally.

Preferably following installation of utility-related elements, two elongate longitudinally disposed outer members 200, 200 are nailed or otherwise attached to the outermost distal ends of trusses 300 and the transverse top wooden front and rear members to define a strong rigid perimeter for the floor frame assembly. The uppermost surfaces of the trusses 300, the two elongate outer members 200, 200, and the transverse top wooden front and rear members, e.g., 1104, all define an upper plane to receive a floor 202 thereon. Floor 202 may be constituted of any suitable material, e.g., planks, plywood, metal or the like and may be attached to the trusses, etc., in any known manner such as gluing, nailing or screwing means, or otherwise. Assorted apertures (not illustrated for simplicity), may be provided in floor 202 to permit the passage therethrough of water and waste pipes, power and telephone wires, and the like in any known manner. A superstructure comprising walls, windows, doors, a roof and the like may then be mounted on top of floor 202, as indicated by phantom lines in FIG. 1. The forming of such a superstructure may be delayed until after the floor frame assembly 100 has been towed to its intended location.

To ensure against the ingress and possible accretion of dirt, insect nests, and assorted debris, and for general aesthetic purposes, it is desirable to provide a thin sheet-like flexible, waterproof, and strong but light cover 408 extending over the entire outside of the underneath and outer side portions of floor frame assembly 100. This is best understood with reference to FIG. 4, wherein is illustrated one convenient manner of attaching cover 408 to the other elements, e.g., by stapling or nailing to underneath surfaces of elongate inner member 122 and outer surfaces of elongate cover supporting elements 406, 406 as well as the outer surfaces of elongate outer members 200, 200 and the transverse top wooden front and rear members, e.g., 1104, defining the perimeter of the floor frame assembly. As will be appreciated, such a flexible cover may comprise a single extensive sheet of a plastics material which can be apertured as appropriate to receive therethrough elements such as brackets 110 to which are to be attached leaf springs 108 to support axles 104, 104 for the mounting of rotatable road wheels 106, 106 thereto. Adhesive tape or the like may be utilized, as appropriate, to seal cover 408 around such zones where the brackets have to penetrate therethrough. Also, as noted earlier, wheels 106 should be selected and disposed outwardly of axis X—X so as to clear cover 408 during towing of the floor frame assembly 100.

Ancillary and necessary elements, such as warning lamps or the like, may be temporarily attached in known manner to floor frame assembly 100 while it is being towed on public highways.

As will be appreciated, if floor frame assembly 100 is to be permanently mounted on cement blocks, elongate walls, or the like, known means may be utilized to raise floor frame assembly 100 into place and to then lower the same onto such external supports so that supporting forces are provided principally under the lower surfaces of lowermost flanges of I-beams 102, 102. This is important because it is metal I-beams 102, 102, preferably constructed of suitable steel and of appropriately selected size and strength, that provide the essential strength to the overall structure. Any necessary tiedowns or anchoring, to ensure against disturbances due to gusts of wind or the like, may be provided in any known manner subsequent to location of the floor frame assembly and its superstructure were intended.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A towable unified floor frame assembly, comprising:
   two elongate inner load-supporting steel I-beams disposed parallel to a longitudinal axis of said floor frame assembly, each of said I-beams having respective front and rear ends;
   a front member and a rear member, connected normal to and between the respective front and rear ends of said I-beams;
   a plurality of elongate metal cross members, each having an L-shaped cross-section with a vertical portion thereof disposed above a horizontal portion, said cross members extending normal to and between the I-beams and connected to at least lower flanges thereof;

an elongate inner member disposed longitudinally along said axis, said inner member being provided with a plurality of vertical notches which are shaped, sized and located to fit over and closely receive said vertical portions of said L-shaped cross members;

two elongate outer members attached to said front and rear end members to define therewith a perimeter of said floor frame assembly, said perimeter having substantially vertical inner and outer perimeter surfaces substantially defined by corresponding inner and outer surfaces of said outer members and said front and rear end members;

a plurality of trusses disposed normal to said I-beams and said outer members, said trusses being disposed at predetermined locations inwardly of said front and rear ends of said outer beams in correspondence with respective ones of said cross members, each truss being connected at respective outermost ends to said elongate outer members at said inner perimeter surface provided thereby, wherein each of said trusses comprises an upper horizontal element disposed above said I-beams and having an uppermost surface coplanar with respective uppermost surfaces of said front and rear end members and said elongate outer members, a vertically depending inner element located to fit to a side of said inner member and to end inside a corresponding L-shaped cross member, two vertically depending outer elements, respectively located to each fit closely to the outermost edge of an upper flange of a corresponding one of said I-beams, and two bracing members, each extending outwardly and upwardly from the lowermost end of a corresponding one of said outer elements to connect underneath the upper horizontal element at a location intermediate the closest I-beam and the closest distal end of said upper horizontal element;

a plurality of metal connecting elements, each attached underneath one of said inclined bracing elements beneath the respective lowermost end thereof and attached at a distal end to the closest I-beam, whereby each of said trusses is securely connected to both I-beams;

a floor mounted atop and to said elongate outer beams, said front and rear end members, and said trusses;

carrier means comprising a plurality of load-bearing wheels, said carrier means being shaped and sized to detachably attach underneath said I-beams; and towing means securely attachable to said I-beams at the respective front ends thereof for applying a towing force to said floor frame assembly.

2. The unified floor frame assembly according to claim 1, wherein:
said elongate outer members and said trusses substantially comprise wood.

3. The unified floor frame assembly according to claim 1, wherein:
said elongate inner member substantially comprises wood.

4. The unified floor frame assembly according to claim 2, wherein:
said elongate inner member substantially comprises wood.

5. The unified floor frame assembly according to claim 1, further comprising:
elongate cover-supporting elements disposed parallel to said I-beams and outwardly thereof, attached to said inclined bracing elements; and
cover means extending underneath said floor frame assembly so as to clear said wheels when said carrier means is attached under said floor frame assembly, said cover means being attached to lower surfaces of said elongate inner member, said elongate cover-supporting members and said elongate outer members.

6. The unified floor frame assembly according to claim 4, further comprising:
elongate cover-supporting elements disposed parallel to said I-beams and outwardly thereof, attached to said inclined bracing elements; and
cover means extending underneath said floor frame assembly so as to clear said wheels when said carrier means is attached under said floor frame assembly, said cover means being attached to lower surfaces of said elongate inner member, said elongate cover-supporting members and said elongate outer members.

7. The unified floor frame assembly according to claim 1, wherein:
said front and rear end members are formed of metal, and said front end member is formed with apertures to accommodate said hitching means therethrough.

8. The towable floor frame assembly according to claim 5, wherein:
said cover means comprises a thin sheet-like, moisture-resistant material.

9. The towable floor frame assembly according to claim 8, further comprising:
thermal insulation material disposed between an said floor and said cover means.

10. The towable floor frame assembly according to claim 9, further comprising:
a utility element comprising at least one of ventilation ducting, water and waste pipes, and electrical wiring, disposed between said floor and said cover means.

11. The unified floor frame assembly according to claim 1, wherein:
said metal cross members are made of steel and are welded to said I-beams to be integrated thereto.

12. The unified floor frame assembly according to claim 1, wherein
said metal connecting elements are made of steel and are welded to said I-beams to be integrated thereto.

13. The unified floor frame assembly according to claim 11, wherein:
said metal connecting elements are made of steel and are welded to said I-beams to be integrated thereto.

14. The unified floor frame assembly according to claim 1, wherein:
said front and rear end members comprise steel portions welded to said I-beams to be integrated thereto.

15. The unified floor frame assembly according to claim 13, wherein:

said front and rear end members comprise steel portions welded to said I-beams to be integrated thereto.

16. The unified floor frame assembly according to claim 14, further comprising:
elongate cover-supporting elements disposed parallel to said I-beams and outwardly thereof, attached to said inclined bracing elements; and
cover means comprising a thin sheet-like moisture-resistant material extending underneath said floor frame assembly so as to clear said wheels when said carrier means is attached under said floor frame assembly, said cover means being attached to lower surfaces of said elongate inner member, said elongate cover-supporting members;
said cover means comprises a thin sheet-like, moisture-resistant material; wherein
a utility element comprising at least one of ventilation ducting, water and waste pipes, and electrical wiring, disposed between said floor and said cover means, and
thermal insulation material disposed between said floor and said cover means; wherein
said elongate outer members and said trusses substantially comprise wood; and
said elongate inner member substantially comprises wood.

* * * * *